Nov. 19, 1946.   P. R. GUERIN ET AL   2,411,263
INDUSTRIAL TRUCK
Filed Aug. 13, 1945   3 Sheets-Sheet 1

INVENTORS
Paul R. Guerin
Herman Musgrave
BY
Hull & West
Attorneys

Nov. 19, 1946.   P. R. GUERIN ET AL   2,411,263
INDUSTRIAL TRUCK
Filed Aug. 13, 1945   3 Sheets-Sheet 3

INVENTORS,
Paul R. Guerin
Herman Musgrave,
BY Hull & West
Attorneys.

Patented Nov. 19, 1946

2,411,263

UNITED STATES PATENT OFFICE 2,411,263

INDUSTRIAL TRUCK

Paul R. Guerin and Herman Musgrave, East Cleveland, Ohio, assignors to Towmotor Corporation, Cleveland, Ohio, a corporation of Ohio Application August 13, 1945, Serial No. 610,408

14 Claims. (Cl. 214—113)

1

This invention relates to industrial trucks, and more particularly to means carried by said trucks for receiving and raising a load upon a carriage assembly and for changing the position of the load-carrying member of said assembly thereby to facilitate depositing the load in any desired position and location. It is the general object of our invention to provide simple and effective power operated mechanism for accomplishing the aforesaid movements of the carriage assembly and its load-carrying member. A further object of the invention is to enable all of these operations to be readily and effectively controllable by the operator.

A still further and more limited object of the invention is to provide hydraulically operated means whereby the load-carriage assembly may be raised and lowered along the mast and rotary movement may be imparted to the load-carrying member of said assembly thereby to facilitate depositing the load carried thereby in any desired position or location.

Figure 1:
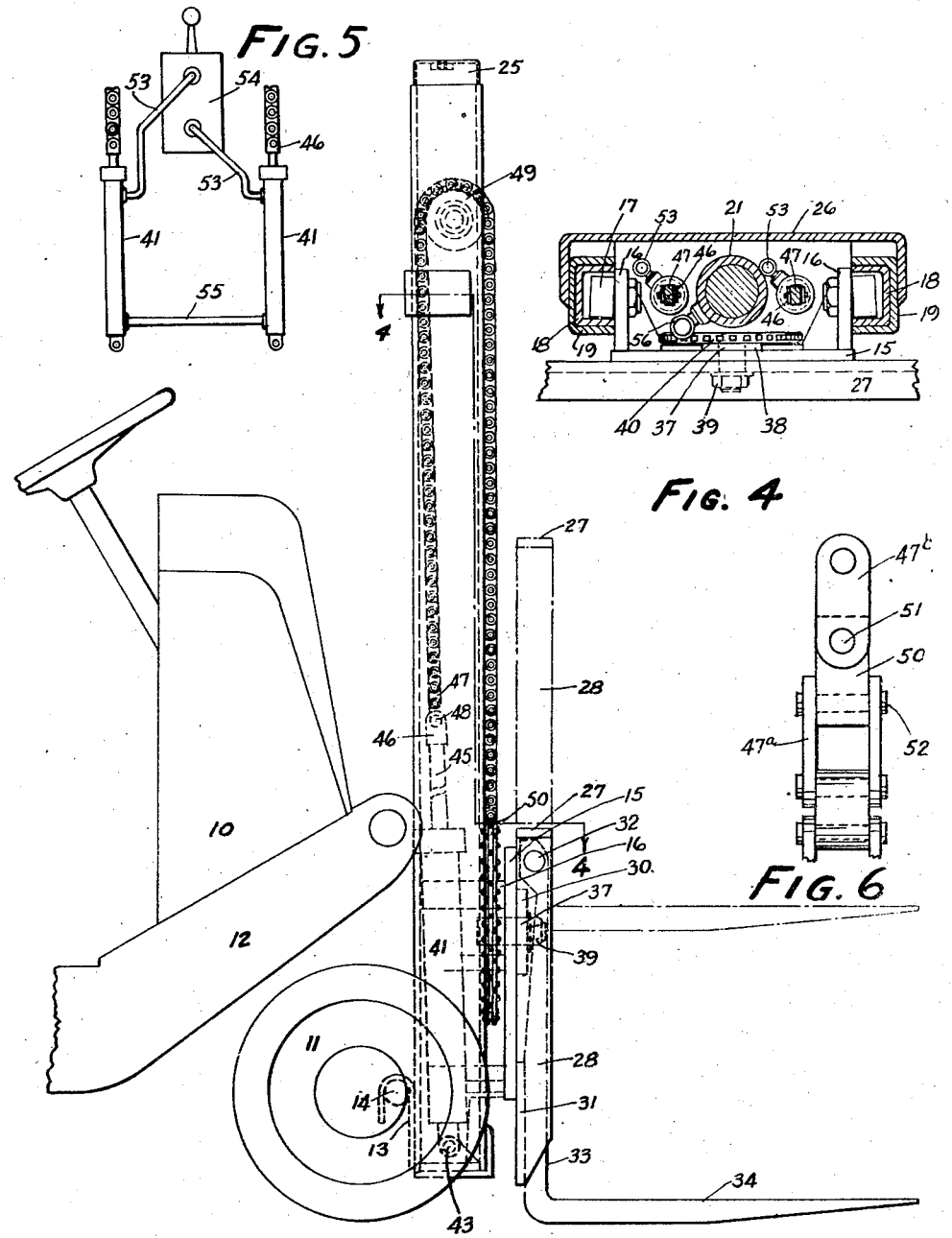
Figure 2:
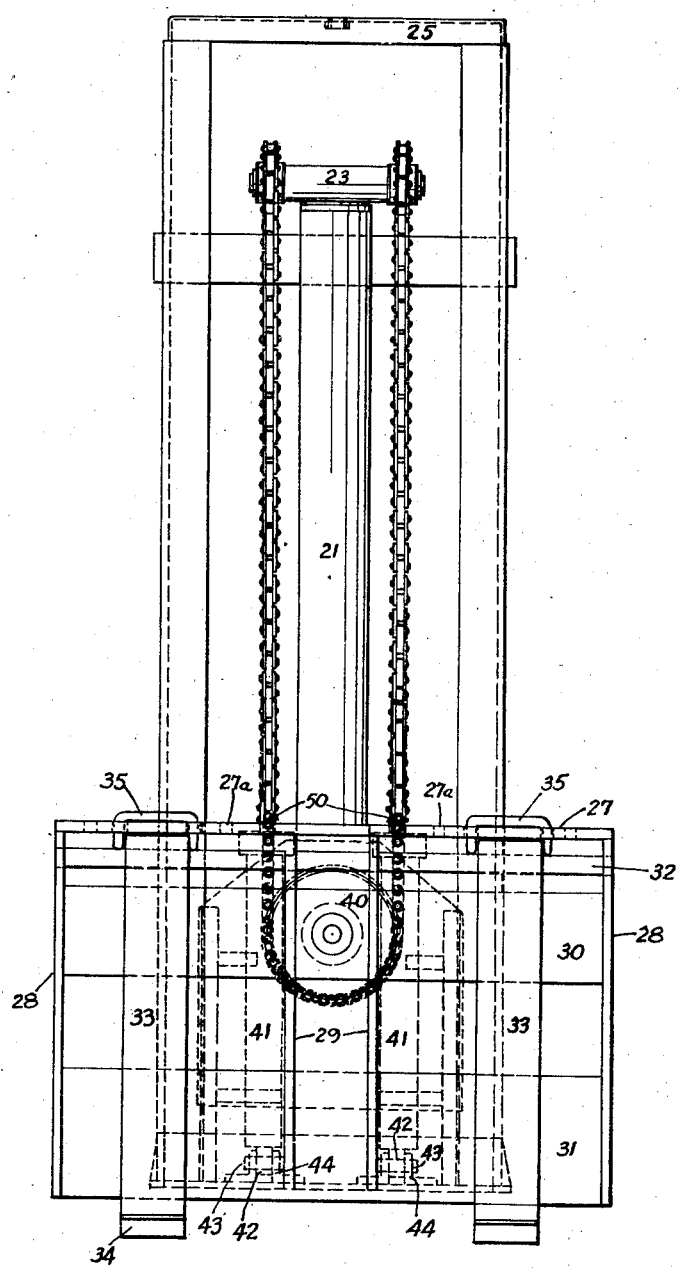
Figure 3:
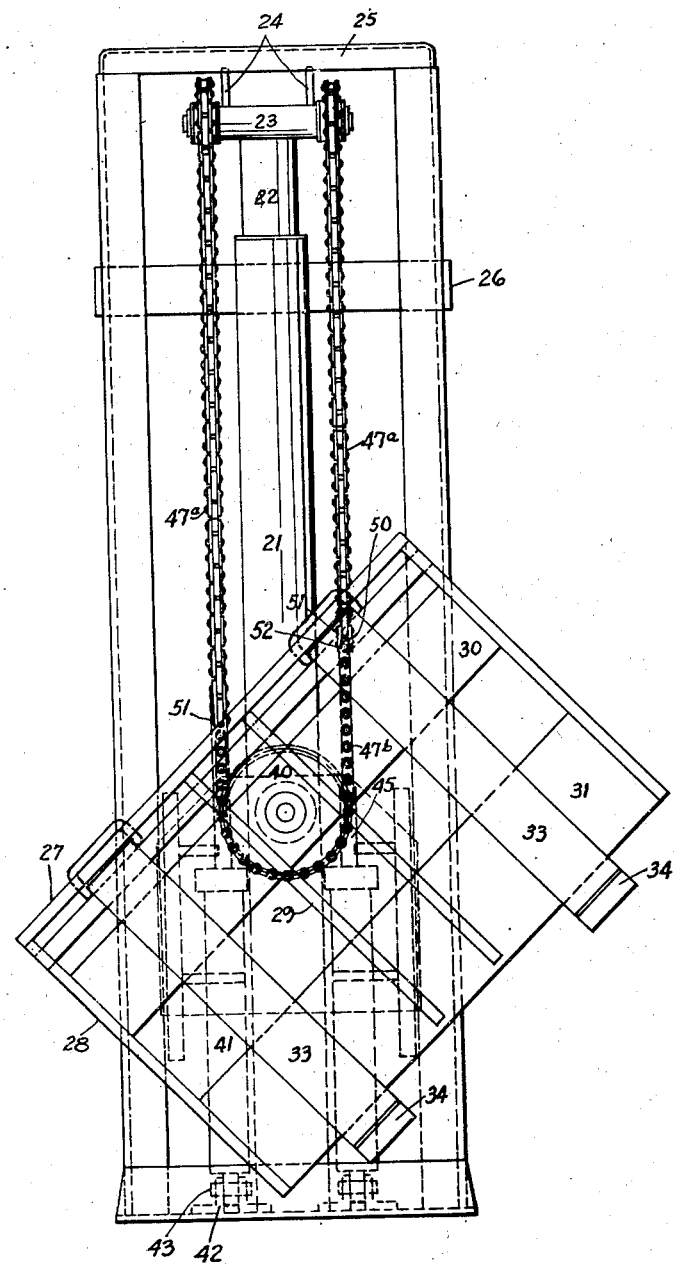

Further and more limited objects of the invention will be set forth in the specification and will be realized in and through the construction and arrangement of parts shown in the drawings hereof wherein Fig. 1 represents a side elevational view of the front portion of an industrial truck and the mast thereof and showing the carriage assembly and the hoisting and tilting mechanism for the carriage assembly constructed in accordance with our invention, a position of the carriage when elevated being indicated by broken lines and the front portion of the truck being represented diagrammatically; Fig. 2 a front elevational view of the mast, carriage-assembly and hoisting and tilting mechanism shown in Fig. 1 and showing the rotatable load-receiving member of said assembly in a load-receiving position; Fig. 3 a view similar to Fig. 2 and showing the rotatable carriage member elevated and also tilted to a position whereby a load thereon may be conveniently discharged at a desired angle; Fig. 4 a detail in section corresponding to the line 4—4 of Fig. 1 and looking in the direction of the arrows; Fig. 5 a diagrammatic view of the means for controlling and supplying liquid to the auxiliary cylinders which constitute part of the means for realizing my invention; and Fig. 6 a detail showing the manner of connecting sections of a chain; the links of one of which sections are arranged at right angles to the links of the other section.

Describing by reference characters the various parts illustrated in the drawings, 10 denotes gen-

2 erally the forward end of the body of an industrial truck, 11 one of the front wheels of the same, and 12 one of a pair of side members of the frame behind which are located the corresponding arms (not shown) which enables the mast to be tilted from a vertical position. Each of the side members of the mast has secured to the lower portion thereof a hook 13 by which the mast is pivotally supported from a cross bar 14 which in turn may be supported by part of the front driving axle (not shown) in the manner illustrated and described in the patent to E. W. Weaver, No. 2,299,445, issued October 20, 1942.

15 denotes generally the front plate of the supporting member of the carriage assembly from opposite sides of which guide plates 16 project rearwardly and engage the inner surfaces of the channeled side members of the mast—see Fig. 4. These guide plates carry upper and lower rollers which are adapted to engage the front and rear flanges respectively of the channeled side members of the auxiliary mast, the upper pair of rollers being shown at 17 in Fig. 4 as engaging the front flanges of the channeled side members 18 of the auxiliary mast which are telescoped within the channeled side members 19 of the main mast.

21 denotes the main hoisting cylinder which is located between the sides of the mast and within which the plunger 22 is mounted, said plunger carrying a cross head 23 at its upper end. The cross head is provided with a pair of ears 24 extending upwardly therefrom and adapted to engage the cross tie 25 which connects the tops of the side members 18 of the auxiliary mast. A yoke 26 is shown as connected to the webs of the channeled members of the main mast and as extending across the rear of the same.

The construction thus far described is substantially identical with that which has been employed by Towmotor Corporation in its production of industrial trucks, and hence needs no further description.

The rotatable carriage member comprises generally a framework consisting of an upper spacer bar 27, vertical side bars 28, centrally located vertical reinforcing bars 29, with an upper cross plate 30 and a lower cross plate 31 connected to the vertical bars 28 and 29.

32 denotes a fork-supporting bar which is mounted in aligned apertures provided therefor in the vertical side and reinforcing bars adjacent to the spacer bar 27. 33 denotes the vertical arms of lifting forks, the lower forwardly projecting ends of which are shown at 34. The upper ends of the fork arms 33 are provided with apertures whereby they are slidably mounted on the bar 32, and may be retained in any desired adjusted position with respect to said bar by means of U-shaped yokes 35, the legs of which are adapted to be inserted through openings 27ª in the top of the spacer bar 27, with their legs embracing opposite sides of the upper ends of the fork arms.

The manner in which the rotatable carriage member is supported for rotation on the supporting member will now be described: 37 denotes a shaft which is journaled in a bushing 38 secured to the front plate 15 of the supporting member of the carriage assembly and which extends through the said plate and through the cross plate 30 and is keyed to the latter, the end which projects through the said plate being reduced and threaded and provided with a nut 39. 40 denotes a circular rotary operating member for the tilting of the rotatable carriage member, the said operating member being itself operated by a flexible member which engages the peripheral portion thereof. The circular member as shown herein is a sprocket since the flexible member which engages its periphery is shown as a chain.

In order to impart rotary movement to the rotatable carriage member through the instrumentality of the said sprocket, we have provided the following construction: 41 denotes cylinders of jacks which are conveniently located within the lower portion of the mast assembly, the lower ends of which cylinders are provided each with a lug 42 whereby it is pivotally supported at its lower end by means of a pivot pin 43 extending through an aperture in said lug and through apertures in brackets 44 which are anchored to the base of the mast assembly. Each of the said cylinders is provided with a piston rod 45 extending through the top of its cylinder. Each piston rod is provided at its upper end with a clevis 46 the open end of which receives therein the block of the lowermost link of a section or member 47 of a cable (shown as a chain) which is connected to the clevis by means of a pin 48. From the said clevises, the ascending reaches of the chain sections or members extend around rollers 49 mounted for rotation on opposite ends of the cross head 23. The lower ends of the descending reaches 47ª of the said chain sections or members are connected with a third bottom section or member 47ᵇ which forms a bight or loop therewith and which is connected thereto as follows: 50 denotes connector blocks, each having their opposite ends bored, with the bores extending at right angles to each other and with the lower ends of the side members 47ᶜ of the bottom links of the descending reaches of the first chain sections or members connected to the upper ends of their respective connector blocks by means of pins 51, while the side members 47ᵈ of the links at the upper ends of the bottom section or member 47ᵇ are connected in like manner to the bottoms of the connector blocks by pins 52 extending through the bores in the bottoms of the blocks and through the upper ends of the said side members. Due to this construction, the links of the chain section or member 47ᵇ are arranged at right angles with respect to the links of the reaches 47ª of the chain sections or members thereabove, which enables the lowermost section or member to obtain a driving connection with the teeth of the sprocket 40. It will be seen that the three flexible sections or members 47, 47ª and 47ᵇ constitute a cable by which rotary tilting movement is imparted to the rotatable carriage assembly.

With the parts constructed and arranged as thus described, the operation will be as follows: When the carriage assembly is in its lowermost position, as shown in Fig. 1, the pistons in the jacks will be adjacent to the tops of their respective cylinders 41 with the rotatable carriage member in the position shown in full lines in Figs. 1 and 2. The cylinders are provided each with a pipe 53 connecting the upper end thereof with a double valve assembly 54, the bottoms of the cylinders being connected by an equalizing pipe 55. The carriage assembly will be lifted before tilting the rotatable carriage member, even to points where it is necessary to resort to the use of the auxiliary mast, which will be elevated as the plunger 22 is raised, by engagement of the ears 24 with the cross tie 25. When the carriage assembly shall have been elevated to the point where it is desired to discharge the load, the rotatable member may be rotated by the auxiliary cylinders and pistons by relieving the pressure on top of one of the pistons and by applying pressure to the top of the other.

Ordinarily the carriage assembly will be lowered by gravity, due to the weight of the same, even when devoid of a load.

It will be noted, from the foregoing, that the cable by which the rotatable carriage member may be tilted can serve the double function of enabling this tilting action to be obtained as well as enabling the carriage assembly to be elevated to any desired extent within the limits of the stroke of the plunger 22. Heretofore, the tilting of rotatable carriage members of carriage assemblies has been obtained by mounting the motive power on said carriage assembly and supplying operating fluid (hydraulic or electric) thereto by hoses or cables draped inconveniently upon the mast.

It will be noted further that the means whereby we are enabled to accomplish the useful functions set forth hereinbefore can be incorporated in a well known type of industrial trucks, with a minimum of alterations with respect to the arrangement of the parts which have been used as standard equipment for such trucks.

Having thus described our invention, what we claim is:

1. In an industrial truck, in combination with the front portion of the frame thereof and a substantially vertical mast assembly supported by the said portion of the frame, a carriage assembly comprising a supporting member slidably mounted upon said mast assembly and a rotatable member provided with load supporting means and mounted for rotary movement upon and with respect to the said supporting means, and common means for lifting the said carriage assembly and for imparting rotary movement to the rotatable member thereof.

2. In an industrial truck, in combination with the front portion of the frame thereof and a substantially vertical mast assembly supported by said portion of the frame, a carriage assembly comprising a supporting member slidably mounted upon said mast assembly and a rotatable member provided with load supporting means and mounted for rotary movement upon and with respect to the said supporting member, means for imparting rotary movement to the rotatable member, and means coöperating with the last mentioned means for imparting lifting movement to the carriage assembly.

3. In an industrial truck, in combination with the front portion of the frame thereof and a substantially vertical mast assembly supported by said portion of the frame, a carriage assembly comprising a supporting member mounted for sliding movement upon the mast assembly and a rotatable member mounted for rotary movement upon and with respect to the said supporting member, means including a cable for lifting the said carriage assembly and for imparting rotary movement to the rotatable carriage member.

4. In an industrial truck, in combination with the front portion of the frame thereof and a substantially vertical mast assembly supported thereby, a carriage assembly comprising a supporting member mounted for sliding movement upon the mast assembly and a rotatable member mounted for rotary movement upon and with respect to the said supporting member, and means for imparting rotary movement to the said rotatable member, the said means comprising a pair of cylinders each having a piston therein with a piston rod extending through an end thereof, rotatable circular supporting members interposed between the projecting ends of the piston rods and the rotatable carriage member, and flexible operating members each connected at one end to the operating end of a piston rod and each extending around a peripheral portion of a rotatable circular supporting member and each having the end portion opposite that which is connected to a piston rod operatively connected to the rotatable carriage member.

5. In the industrial truck set forth in claim 4, means for raising and lowering the carriage assembly independently of said cylinders and piston rods.

6. In the industrial truck set forth in claim 4, a main hoisting cylinder and a plunger therein, the said plunger supporting the rotatable circular supporting members.

7. In the industrial truck set forth in claim 4, the mast assembly comprising a main mast and an extensible mast mounted for sliding movement upon the main mast, a main cylinder, a plunger therein, and a cross head on said plunger on which the rotatable circular supporting members are mounted, the cross head being adapted by the elevation of the plunger to elevate the extensible mast.

8. In an industrial truck, in combination with the front portion of the frame thereof and a substantially vertical mast assembly supported by said portion of the frame, a carriage assembly comprising a supporting member slidably mounted upon said mast assembly and a rotatable member provided with load supporting means and mounted for rotary movement upon and with respect to the said supporting member, a pair of cylinders, pistons within said cylinders having piston rods projecting through ends of the latter, and a rotatable circular supporting member interposed between the operating end of each piston rod and the rotatable carriage member, and means for rotating the rotatable carriage member comprising a shaft rigidly connected with the rotatable carriage member and mounted for rotation upon and supported by the supporting member of said carriage assembly, a rotatable circular operating member rigid with the said shaft, and a cable having its opposite ends connected with the operating ends of said piston rods and having a reach extending from each of said rods around a peripheral portion of its cooperating rotatable circular supporting member, the said cable having a looped portion extending from the rotatable circular supporting members to and around a peripheral portion of the circular operating member for the rotatable carriage member.

9. In the industrial truck set forth in claim 8, means for raising and lowering the carriage assembly independently of said cylinders and piston rods.

10. In the industrial truck set forth in claim 8, the rotatable circular supporting members being located above the cylinders and pistons and being carried on opposite ends of a cross head, a plunger on the upper end of which the cross head is supported, and a cylinder within which said plunger is mounted.

11. In an industrial truck, in combination with the front portion of the frame thereof and a substantially vertical mast assembly supported by said portion of the frame, a carriage assembly comprising a supporting member slidably mounted upon said mast assembly and a rotatable member provided with load supporting means and mounted for rotary movement upon and with respect to said supporting member, a pair of cylinders, pistons within said cylinders having piston rods projecting through ends thereof, rotatable circular supporting members interposed between the operating ends of said piston rods and the rotatable carriage member, a shaft secured to said rotatable carriage member and supported for rotary movement by the supporting member of the carriage assembly, a sprocket on the said shaft, a chain having its opposite ends connected to the operating ends of the said piston rods with reaches passing around peripheral portions of the corresponding rotatable circular supporting members and with other reaches extending from said rotatable circular supporting members and formed into a bight or loop which extends around a peripheral portion of the said sprocket, and means for imparting movement to the pistons within their respective cylinders.

12. In the industrial truck recited in claim 11, a main hoisting cylinder and a plunger therein, the said plunger supporting the rotatable circular supporting members.

13. In an industrial truck, in combination with the front portion of the frame thereof and a substantially vertical mast assembly supported by the aforesaid portion of the frame, a carriage assembly comprising a supporting member slidably mounted upon said mast assembly and a rotatable member provided with load supporting means, a shaft supported for rotary movement by the said supporting member and rigidly connected to the rotatable member, a sprocket upon said shaft, a pair of cylinders, pistons within said cylinders having piston rods projecting through ends thereof, a rotatable circular supporting member interposed between the operating end of each of said piston rods and the rotatable carriage member, chain members connected each at one end thereof to the operating end of the cooperating piston rod, the said chain members comprising reaches extending around peripheral portions of the respective rotatable circular supporting members and additional reaches extending from said circular supporting members, and a third chain member having its links arranged at right angles to the links on the other two chain members and extending around a peripheral portion of the sprocket, and means for connecting the upper ends of the third chain member to the ends of the additional reaches of the said other chain members.

14. In the industrial truck recited in claim 13, the means for connecting the ends of the third chain member to the ends of the additional reaches of the other chain members comprising connector blocks each provided at one thereof with means for connecting thereto the end of one of the said additional reaches and at its other end with means, at right angles to the first mentioned means, for connecting thereto an end of the third chain member.

PAUL R. GUERIN.
HERMAN MUSGRAVE.